Jan. 10, 1967 L. LICHT ETAL 3,297,221

TRANSPORT MECHANISM FOR FLEXIBLE MATERIALS

Filed Aug. 10, 1964 2 Sheets-Sheet 1

INVENTORS
LAZAR LICHT
DAVID E. BRICKL
BENDIX H. INDERGARD

BY Francis J. Thomas
ATTORNEY 3,297,221
Patented Jan. 10, 1967

3,297,221

TRANSPORT MECHANISM FOR FLEXIBLE MATERIALS

Lazar Licht, Irvington, David E. Brickl, New York, and Bendix H. Indergard, Croton-on-Hudson, N.Y., assignors to International Business Machines Corporation, New York, N.Y., a corporation of New York Filed Aug. 10, 1964, Ser. No. 388,622
13 Claims. (Cl. 226—97)

This invention relates to techniques for transporting flexible materials and, in particular, for transporting continuous sheets of materials, such as tapes, at controlled speeds and tensions.

Flexible materials are necessarily transported at controlled speeds in many applications. For example, the magnetic tape used with computers for data storage is unwound from a reel, passed by a transducer and wound upon another reel. In operation, greater acceleration of the tape in the vicinity of the transducer is required than is possible by controlling the reels. Two vacuum columns are generally employed, one on each side of the transducer, as buffers to take up tape slack and to permit the movement of the tape at the transducer to be relatively independent of the movement of the reels. The vacuum column technique is shown in United States Patent No. 3,057,568 to James A. Weidenhammer and Walter S. Buslik, and United States Patent No. 3,057,569 to James A. Weidenhammer. As a further example, many process control facilities for manufacturing, curing, drying, coating or treating sheets of material require that the material be fed through the various steps in the processes at controlled speeds and tensions.

Flexible materials are often transported by the use of rollers, capstans or other devices employing frictional contact with the materials. However, these techniques can damage fragile materials such as magnetic tapes, especially when repeated transport is required. Furthermore, in many process control applications, the processed material adheres to the friction mechanism resulting in nonuniform treatment of the material and the frequent necessity to clean the mechanism.

The above-mentioned vacuum column mechanism provides nonfrictional movement of material (tape) but requires a substantially completely enclosed container to maintain the vacuum, and the configuration of the tape conforms generally to the shape of the container.

In the present invention, the material is contained between two parallel plates and is acted on by a fluid (gas or liquid) under pressure which causes the material to assume a generally circular loop configuration. In the preferred embodiment of the invention, pressure-sensitive devices are arranged to sense the pressure at various points in the mechanism to control the operation of the tape reels. In this embodiment, the amount of tape in the mechanism is maintained within predetermined bounds as the variations caused by the tape entering the mechanism from the transducer or leaving the mechanism to the transducer are compensated for by winding or unwinding tape from the reels.

The tension of the material that is present within the mechanism is a function of the fluid pressure and of the loop size. Hence, the mechanism is also useful in process control applications, when the transportation and tension of material is controllable by varying the rate of flow of the applied fluid, by varying the dimensions of exit and inlet ports and other fluid flow parameters. In this embodiment of the invention, the material enters and leaves the pressurized region on adjacently located fluid bearings and the loop fluid pressure is controlled by varying the gap between the entering material and the exiting material. This variation is accomplished by controlling the fluid bearing pressure. For example, an increase in fluid bearing pressure forces the entering and exiting material toward each other, reducing the size of the gap through which fluid is removed from within the loop of material and, hence, the loop pressure increases, causing the loop tension to increase. Conversely, a reduction of fluid bearing pressure causes the loop tension to decrease.

Accordingly, it is an object of the present invention to provide an improved transport mechanism for flexible materials.

Another object is to provide an intermediary buffer mechanism between a low acceleration transport mechanism, such as a reel mechanism, and a high acceleration mechanism, such as a magnetic tape transducer mechanism.

Another object is to provide a buffer mechanism for containing a portion of tape between a tape reel mechanism and a transducer mechanism to permit the tape to be moved at higher accelerations at the transducer mechanism than are obtainable by the tape reel mechanism.

A further object is to provide an improved transport mechanism for flexible materials wherein fluid (gas or liquid) pressure is controllably applied to the material to cause a loop of controlled dimensions and tension to be formed.

A further object is to provide an improved transport mechanism for flexible materials wherein fluid (gas or liquid) pressure is controllably applied to the material to cause a loop of controlled tension to be formed and wherein the pressure is controlled by varying the applied fluid pressure or by varying the dimensions of fluid exit ports.

A further object is to provide an improved transport mechanism for flexible materials wherein fluid (gas or liquid) pressure is controllably applied to the material to cause a loop of controlled tension to be formed and wherein the pressure is controlled by varying the gap between the entering and exiting material.

A still further object is to provide an improved transport mechanism for flexible materials wherein fluid (gas or liquid) pressure is controllably applied to the material to cause a loop of controlled tension to be formed and wherein the pressure is controlled by varying the gap between the entering and exiting material by varying the pressure on fluid bearings upon which the material enters and leaves the mechanism.

The foregoing and other objects, features and advantages of the invention will be apparent from the following more particular description of preferred embodiments of the invention, as illustrated in the accompanying drawings.

Figure 1:
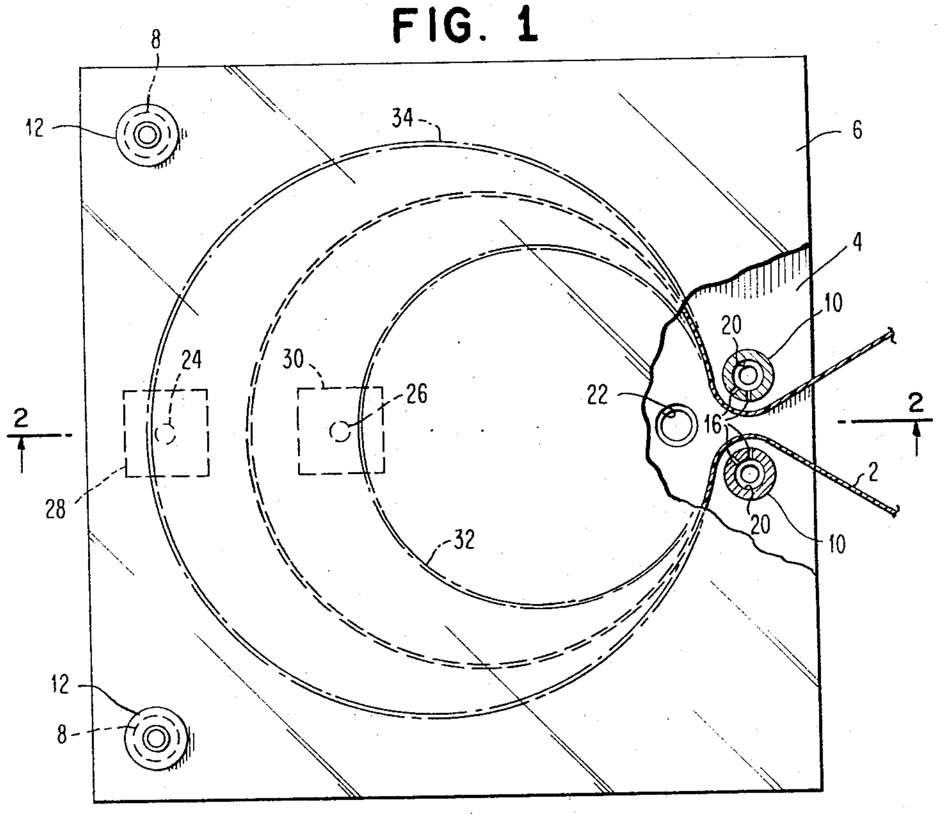
FIG. 1 is a drawing showing a partially cut-away front view of the preferred embodiment of the invention.
Figure 2:
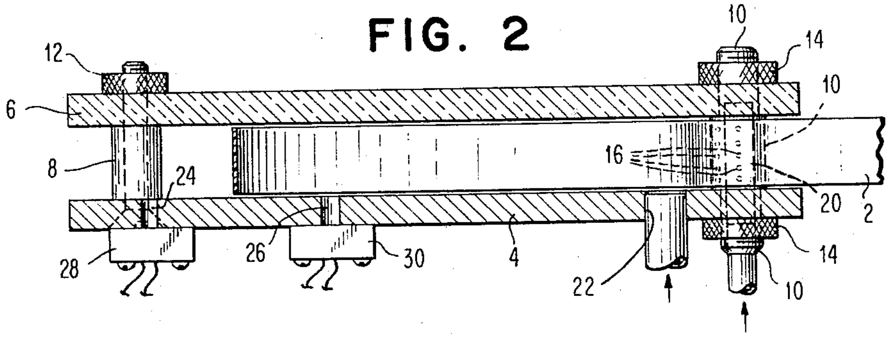
FIG. 2 is a sectional view of the preferred embodiment of the invention taken along line 2—2 in FIG. 1.

In the preferred embodiment of the invention as shown in FIGS. 1 and 2, a loop of flexible material 2, such as conventional magnetic tape, is present in an assembly which comprises a bottom plate 4 and a top plate 6. The plates are mounted parallel to each other at a distance that is slightly greater than the width of the tape. This distance is maintained by spacers 8 and by air bearings 10. As shown more clearly in FIG. 2, the spacers 8 are hollow cylindrical tubes and nuts and bolts 12 compress the plates 4 and 6 against the ends of the spacers. The construction of the air bearings 10 is shown in greater detail in FIG. 3 where the center portion of the air bearings has a greater diameter than the end portions. As shown in FIG. 2, two nuts 14 are threaded on the end portions of the air bearing to maintain the plates 4 and 6 with the correct spacing. Although for the sake of clarity, the tape is shown in FIG. 2 to have a width that is considerably less than the distance between the plates 4 and 6; in actuality, the space between the tape and the plates is only great enough to permit the tape to be moved without significant frictional contact with the plates.

Figure 3:
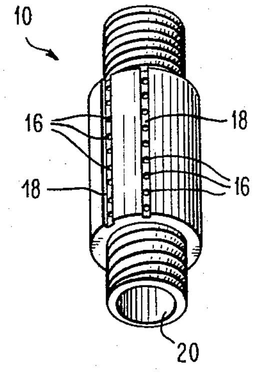
FIG. 3 is a detailed diagram of an air bearing that is suitable for use in the invention.

Referring to FIG. 1, the tape 2 enters and leaves the assembly on air bearings 10. These bearings are conventional, nonrotating, perforated cylinders having a hole drilled partially through in the axial direction. A suitable air bearing is shown in FIG. 3 where two rows of apertures 16 are aligned in grooves 18 such that when air pressure is applied to the drilled opening 20, air flows through the apertures. The grooves are used to cause the air to exit with substantially uniform pressure along the direction of the grooves. Thus, the air bearings emit air under pressure to permit the tape to pass the bearings without physical contact.

Returning to FIGS. 1 and 2, an aperture 22 is provided in the bottom plate 4 to permit air to be applied under pressure. This air causes the material to assume a generally circular configuration within the assembly. The aperture 22 is located near bearings 10 so that pressure can be applied to the loop even though its dimensions are small. The tension of the loop is dependent upon several parameters including the size of the loop, the air pressure at aperture 22, and the amount of pressure leakage in the gap between the entering and exiting material and between the material and the plates.

In the preferred embodiment of the invention, as illustrated in FIGS. 1 and 2, the bottom plate 4 contains two apertures 24 and 26. In this embodiment, where the loop of material is used as a buffer in a magnetic tape recording device, a pair of pressure switches 28 and 30 are mounted on the bottom plate 4 to sense the pressure at apertures 24 and 26. In operation, when the tape loop is reduced in size (due to tape being removed from the assembly to a transducer) to where it assumes a position shown by curve 32, air pressure is removed from aperture 26 and the associated pressure switch 30 closes. Current through this switch is used in a conventional manner to control a tape reel mechanism to cause the tape feed reel to unwind, supplying more tape to the assembly. Conversely, when the tape loop is increased in size (because of tape entering the assembly from the transducer) to where it assumes a dimension as shown by curve 34, the air pressure within the loop is applied through aperture 24 to the associated pressure switch 28. This, in turn, controls the tape reel mechanism to cause the take up reel to wind, reducting the size of the loop. In this manner, the loop of tape increases and decreases in size as tape is supplied to or removed from the assembly to provide a buffering action between the operation of the transducer and the operation of the reels.

Figure 4:
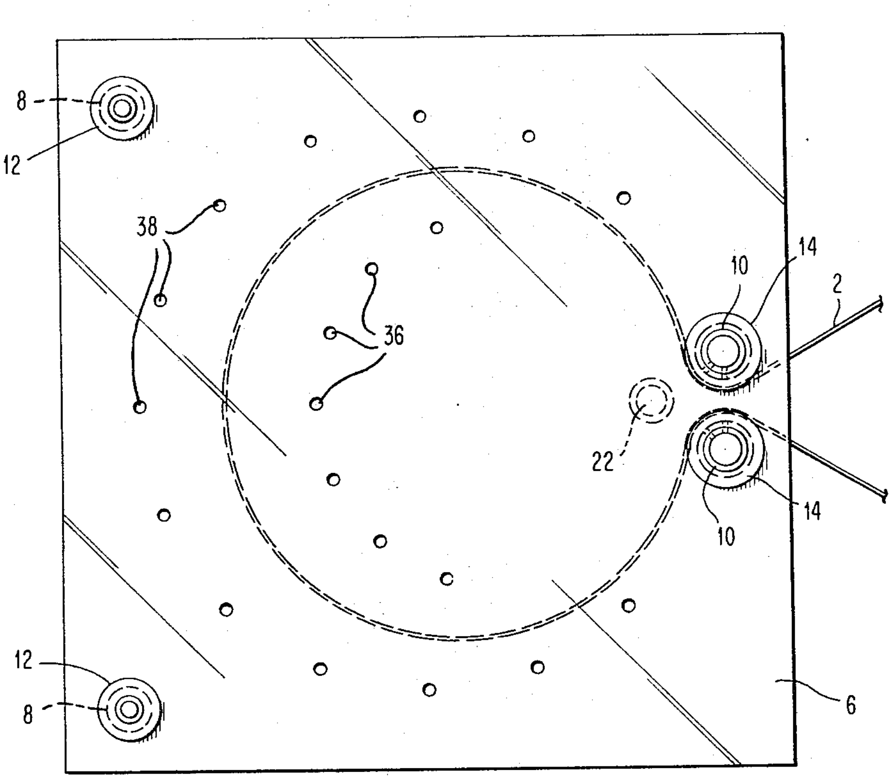
FIG. 4 is a drawing showing a front view of a second embodiment of the invention.

A second embodiment of the invention is shown in FIG. 4. In this embodiment, which is especially suitable for process control applications, the material 2 is moved through the assembly under the control of an external force and the tension of the material is controlled by the internal loop pressure. The material can be processed while in the assembly; that is, the material can be dried, sprayed, coated, etc., or a liquid or gas can be applied through aperture 22 for reaction with the material. For example, a developing fluid can be applied to a photographic film in this manner. Obviously, the entire assembly can be immersed in a liquid or gas chamber.

Figure 5:
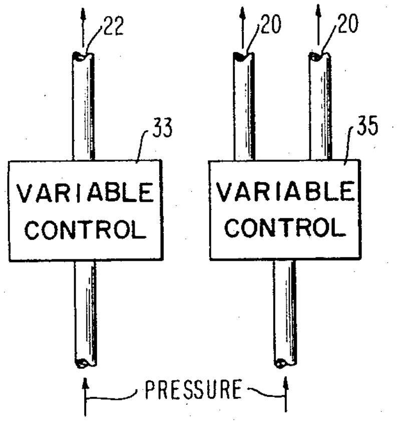
FIG. 5 is a drawing showing a pressure control system.

In this embodiment, the loop tension is controlled by either controlling the fluid (liquid or gas) pressure at aperture 22 or by controlling the fluid pressure in bearings 10. In the latter case, increasing the bearing pressure forces the entering and exiting material toward each other, reducing the gap through which the fluid from within the loop can pass and, hence increasing the tension of the material. Conversely, reducing the bearing pressure causes the tension to decrease. FIG. 5 shows a pressure system employing variable control elements 33 and 35 to control the fluid (gas or liquid) pressure at aperture 22 and at apertures 20 in bearings 10.

In the embodiment of FIG. 4, another technique for controlling the tension of the material incorporates the use of apertures 36 and 38. These apertures permit the loop fluid pressure to escape when the loop configuration includes the apertures. That is, when the loop has a size that is less than the size determined by apertures 36, the mechanism operates in the manner described above. When the loop is large enough to encompass apertures 36, fluid leaks through these apertures, reducing the internal loop pressure and, hence, the tension of the material. Finally, when the loop is so large as to encompass apertures 38, further leakage occurs, resulting in a further decrease in tension. Obviously, the two rows of apertures 32 and 34 can be placed as close together as desired to control more precisely the loop pressure with respect to the loop size, and more or fewer rows of apertures can be employed. Similarly, various shaped apertures, including wedge-shaped apertures, can be used instead of the circular apertures that are shown in FIG. 4. In the case of wedge-shaped apertures that point toward the bearing gap, the tension is gradually reduced as the loop size increases to encompass the wider portions of the wedges.

Alternatively, the plates 4 and 6 can be arranged so that they are not exactly parallel, with a greater spacing in the region of the spaces 8 than in the region of the bearings 10. In this case, leakage around the material increases when the size of the loop is increased, reducing the tension.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A transport mechanism for flexible strip material comprising, in combination:

two essentially parallel plates that are spaced apart from each other by a distance that slightly exceeds the width of the strip of material to be transported;

material guiding means located between the plates for controlling the position of the open end of a loop of material extending into the mechanism such that the opening forms a relatively small gap;

and means for applying fluid under pressure to a chamber formed by the plates and the loop of material that is within the mechanism to cause a loop of material to be formed in the mechanism, where said plate constitute the sole confining means for said loop.

2. The apparatus described in claim 1, wherein the fluid is a gas.

3. The apparatus described in claim 2, wherein the gas is air.

4. The apparatus described in claim 1, wherein the material guiding means are fluid bearings, comprising means for controlling the pressure of the fluid by varying the fluid bearing pressure to control the gap width, whereby the fluid leakage between the displaced portions of the material is altered.

5. The apparatus described in claim 1, further comprising means for controlling the pressure of the fluid by varying the applied fluid flow, said fluid flow being applied through an aperture in one of said plates, said aperture being within the circumference of said loop.

6. The apparatus described in claim 1, wherein at least one plate contains at least one aperture to permit fluid leakage under predetermined conditions whereby the size of the loop is controlled.

7. The apparatus described in claim 1, including two pressure-sensitive devices arranged to sense the fluid pressure that is present at two predetermined positions within the mechanism, said predetermined positions corresponding to circular loops of varying diameters.

8. The apparatus described in claim 7, wherein the pressure-sensitive device that senses the pressure at one position provides an indication when the loop of material does not encompass this position, said indication corresponding to a loop that is below a predetermined size;

and wherein the pressure-sensitive device that senses the pressure at the other position provides an indication when the loop of material encompasses this position, said indication corresponding to a loop that is in excess of a second predetermined size.

9. A tape control mechanism comprising, in combination:

two parallel plates that are spaced apart from each other by a distance that slightly exceeds the width of the tape;

two air bearings that are mounted relatively near each other between the plates with their axes perpendicular to the plates;

means for causing air to enter the mechanism under pressure to cause a tape loop to be formed when tape is present in the mechanism, said tape loop being approximately cylindrical in shape;

a first device for sensing the air pressure at a first region in the mechanism and for providing a predetermined indication when the pressure fails to exceed a predetermined amount;

and a second device for sensing the air pressure at a second region in the mechanism and for providing a predetermined indication when the pressure exceeds a predetermined amount.

10. A transport mechanism for flexible materials comprising, in combination:

two parallel plates that are spaced apart from each other by a distance that slightly exceeds the width of the material to be transported;

two fluid bearings for conveying material to and from the mechanism, located relatively near each other between the plates with their axes perpendicular to the plates, for supplying a controllable pressure zone in the vicinity of the bearings;

and means for applying fluid under pressure in a region surrounded by the plates and the material that is within the mechanism to cause a loop of material to be formed in the mechanism, so that some fluid escapes through a gap between the entering and leaving portions of the transported material.

whereby the pressure of the loop is determined by the size of the gap between the material in the region of the bearings, as controllable by the bearing fluid pressure.

11. The apparatus described in claim 10, comprising a plurality of apertures located circularly in at least one plate, approximating the desired shape of the tape loop, said apertures permitting loop fluid leakage when encompassed by the loop.

12. A tape control mechanism comprising, in combination:

two parallel plates spaced apart from each other by a distance slightly exceeding the width of the tape;

a tape gap formed by two elongated air bearings each having at least one row of air ports, said bearings being mounted between said plates with their axes perpendicular to said plates and said rows of air ports directed substantially toward each other;

means for applying air to said mechanism under pressure to cause a loop to form in a fold of tape extended through said gap;

a first plurality of sensing devices positioned to be encompassed within a tape loop of a given size;

a second plurality of sensing devices positioned to be encompassed within a tape loop of a given larger size;

said first and second sensing devices being operative to indicate the presence and absence of loops of said given sizes respectively.

13. A transport mechanism for flexible strip material comprising:

two essentially parallel plates that are spaced apart from each other by a distance that slightly exceeds the width of the strip of material to be transported;

an aperture in one of said plates with means to enter fluid under pressure through said aperture;

a plurality of air bearings located between the plates for controlling the position of the open ends of a loop of material extending into the mechanism such that the opening forms a relatively small gap, and including means for applying fluid under pressure to said air bearings;

a plurality of apertures in at least one of the plates, with pressure sensing means to detect the pressure at discrete points between the plates;

the flexible material being maintained circular and at a predetermined size by the control of the air pressure in the air bearings as well as in the aperture, said combination of air pressures being responsive to the pressure sensing means.

References Cited by the Examiner

UNITED STATES PATENTS

| | | | |
|---|---|---|---|
| 3,112,473 | 11/1963 | Wicklund | 226—97 X |
| 3,180,547 | 4/1965 | Gruczelak | 226—118 |
| 3,185,400 | 5/1965 | Maxey | 226—95 X |
| 3,197,339 | 7/1965 | Black | 226—7 X |

M. HENSON WOOD, Jr., *Primary Examiner.*

R. A. SCHACHER, *Assistant Examiner.*